US008538919B1

(12) United States Patent
Nielsen et al.

(10) Patent No.: US 8,538,919 B1
(45) Date of Patent: Sep. 17, 2013

(54) SYSTEM, METHOD, AND COMPUTER PROGRAM FOR REAL TIME REMOTE RECOVERY OF VIRTUAL COMPUTING MACHINES

(76) Inventors: Eric H. Nielsen, Santa Cruz, CA (US); Hans H. Nielsen, Santa Cruz, CA (US)

(*) Notice: Subject to any disclaimer, the term of this patent is extended or adjusted under 35 U.S.C. 154(b) by 462 days.

(21) Appl. No.: 12/780,820

(22) Filed: May 14, 2010

Related U.S. Application Data

(60) Provisional application No. 61/216,269, filed on May 16, 2009.

(51) Int. Cl.
*G06F 7/00* (2006.01)
*G06F 9/46* (2006.01)
*H04L 9/00* (2006.01)

(52) U.S. Cl.
USPC ............... 707/610; 707/624; 380/277; 718/1

(58) Field of Classification Search
USPC .................. 707/625, 610, 624, 634, 999.202; 718/1; 714/4.11, 13, 15
See application file for complete search history.

(56) References Cited

U.S. PATENT DOCUMENTS

| | | | |
|---|---|---|---|
| 6,131,148 A | 10/2000 | West et al. | |
| 7,039,828 B1* | 5/2006 | Scott | 714/4.11 |
| 7,072,915 B2 | 7/2006 | Kaczmarski et al. | |
| 7,152,160 B2* | 12/2006 | Lantto et al. | 713/168 |
| 7,680,919 B2 | 3/2010 | Nelson | |
| 7,680,996 B2 | 3/2010 | Komarov et al. | |
| 8,060,683 B2* | 11/2011 | Shultz et al. | 711/6 |
| 8,117,495 B2* | 2/2012 | Graham et al. | 714/11 |
| 8,214,878 B1* | 7/2012 | Hernacki et al. | 726/1 |
| 8,289,878 B1* | 10/2012 | Gonzalez et al. | 370/254 |
| 2002/0147849 A1* | 10/2002 | Wong et al. | 709/246 |
| 2003/0079121 A1* | 4/2003 | Gilman et al. | 713/153 |
| 2003/0112808 A1* | 6/2003 | Solomon | 370/400 |
| 2004/0109440 A1* | 6/2004 | Mattathil | 370/352 |
| 2004/0255164 A1 | 12/2004 | Wesemann | |
| 2006/0137005 A1* | 6/2006 | Park | 726/21 |
| 2007/0112895 A1 | 5/2007 | Ahrens et al. | |
| 2007/0174429 A1 | 7/2007 | Mazzaferri et al. | |
| 2007/0186001 A1* | 8/2007 | Wayda et al. | 709/230 |
| 2008/0016387 A1* | 1/2008 | Bensinger | 714/4 |
| 2008/0033902 A1 | 2/2008 | Glaizel et al. | |
| 2008/0104588 A1* | 5/2008 | Barber et al. | 718/1 |
| 2008/0140963 A1 | 6/2008 | Thomason et al. | |
| 2008/0162841 A1 | 7/2008 | Boutcher | |
| 2008/0162842 A1 | 7/2008 | Boutcher | |
| 2008/0201455 A1 | 8/2008 | Husain | |
| 2008/0243954 A1* | 10/2008 | Augenstein et al. | 707/204 |

(Continued)

FOREIGN PATENT DOCUMENTS

CN 101609419 A1 12/2009
WO WO2010030996 A1 3/2010

OTHER PUBLICATIONS

U.S. Appl. No. 61/216,269, filed May 16, 2009.

*Primary Examiner* — Robert Timblin
(74) *Attorney, Agent, or Firm* — Joshua D. Isenberg; JDI Patent

(57) ABSTRACT

Systems, methods, and computer program products are provided for deployment of a plurality of guest computing systems in two or more locations simultaneously. The individual components of the system, method, and computer programs that compose the backup, recovery, networking, license management, and security enhancements; the collection of some or all of these components into a single system are also described.

8 Claims, 11 Drawing Sheets

Example Network Details to run a Guest at Location B

(56) References Cited

U.S. PATENT DOCUMENTS

| | | |
|---|---|---|
| 2008/0263390 A1* | 10/2008 | Baba et al. .................. 714/4 |
| 2008/0270825 A1* | 10/2008 | Goodson et al. ............. 714/6 |
| 2008/0307020 A1 | 12/2008 | Ko et al. |
| 2009/0007147 A1 | 1/2009 | Craft et al. |
| 2009/0037680 A1 | 2/2009 | Colbert et al. |
| 2009/0150885 A1* | 6/2009 | Safari et al. ................ 718/1 |
| 2009/0216816 A1 | 8/2009 | Basler et al. |
| 2009/0274153 A1* | 11/2009 | Kuo et al. ................. 370/392 |
| 2009/0300080 A1 | 12/2009 | Stringham |
| 2009/0300606 A1* | 12/2009 | Miller et al. ............... 718/1 |
| 2010/0058106 A1 | 3/2010 | Srinivasan et al. |
| 2010/0082922 A1 | 4/2010 | George et al. |

* cited by examiner

Network Architecture

Computing System

Virtualized Computing System Platform

Physical Network

Source-side process for replication at location A

Receive-side process for replication at location "B"

Example Network Details to run a Guest at Location B

Second Example of Network Details to run a Guest at Location B

Automated Remote Recovery of Guest Computing System

End-to-End Encryption of Guest Computing System Data

SYSTEM, METHOD, AND COMPUTER PROGRAM FOR REAL TIME REMOTE RECOVERY OF VIRTUAL COMPUTING MACHINES

CLAIM OF PRIORITY BENEFIT

This application claims the priority benefit of U.S. Provisional Patent Application No. 61/216,269, filed May 16, 2009, the entire contents of which are incorporated herein by reference.

FIELD OF THE INVENTION

Embodiments of the present invention relate to virtual computing, and more particularly to backup, real time system replication, and real time system recovery, incorporating issues of licensing, security, bandwidth utilization and networking, as well as related a deployment method and business practice.

BACKGROUND

In virtual computing systems, one computer can remotely control another computer. Virtual computing often involves implementing virtual or paravirtual machines. A virtual machine (VM) is a software implementation of a machine (e.g., a computer) that executes programs like a physical machine. A paravirtual machine is similar to a VM except hardware drivers of a paravirtualized machine are optimized for hypervisor performance. For purposes of this invention, paravirtual and virtual machines are interchangeable.

United States Patent Application Publication Number 20100082922 entitled VIRTUAL MACHINE MIGRATION USING LOCAL STORAGE describes replication of operating/executing virtual machines so that execution by a machine at a given snapshot of time on one physical server may continue from the same step on a replica machine on a different physical server. It implicitly presumes the same network context/subnet for the machine copy locations. The intent of this replication is to migrate virtual machines among servers in a single datacenter. The publication does not recognize that the approach is unworkable when time delays, bandwidth limits, and network reliability between machine copies occur, or that the virtual machine copying and migration process has inherent reliability, security, and reachability problems that must be overcome to make a workable solution when copying occurs at two separate physical or network locations.

In virtual machine systems it is often desirable to provide for live file transfer between machines. United States Patent Application Publication Number 20080033902 describes a system and method for transferring operating systems, applications and data between a source machine and a target machine while the source machine is running. Attempting to do this file transfer so introduces the problem of attempting to transfer files that may be in use or "live", as such they will be locked by another process during the transfer. Publication Number 20080033902 addresses the problem of transferring locked files and ensuring the most current version is transferred to the target machine. However, the method and system described therein is "file system aware" which means that its operation depends on knowledge of how data (usually stored in blocks) is organized to be accessed, read, and written as files by the source machine in order to locate the bytes that will be transferred to a target machine. Since different machines can have different file systems, a different version of the method and system must be implemented for each different machine.

Data backup is an essential part of a maintenance plan for any computer system because it is the only remedy against data loss in case of disaster. The fundamental requirement to backup is keeping data integrity. When online data are backed up, both production and backup software access data in parallel and so parts of source data can be modified before they have been backed up. So that backup software should provide coherency of backed up online data in order to supply backup integrity. Virtual machine systems often involve some form of backup when migrating an application from one system to another. For example, United States Patent Application Publication Number 20090216816 describes use of a signal to an application prior to backup to prepare it to backup. A signal is sent to the system that is to be backed up in preparation of a backup. With backup there is the implicit assumption that a coherent backup is useful, as in this publication. Usefulness of a machine backup assumes that recovery involves restoration of the machine on the same hardware or virtualized hardware, where-as in reality machine backups often require changes in order that the images can be used directly, or that only a subset of useful data is extracted from the backup during recovery.

Several methods have been invented to provide data coherency in online backup, from which the most advantageous are ones based on the concept of "snapshots". A snapshot is generally a virtually independent logical copy of data storage (e.g. a volume, a disk, a database or the like) at a particular instant in time. There are file system level and block level implementations of snapshots, yet hereafter only the block-level snapshots are discussed because of their universality and therefore more convenience for general-purpose backup solutions of arbitrary machine data. Once a snapshot has been created, it can be exposed as a virtual read-only storage whose data can be accessed via standard I/O functions. As soon as a snapshot has been created, production software continues working with production storage while snapshotted data are commonly used for various maintenance tasks such as backup, replication, verification et cetera. There multiple principles of snapshot operation have been contrived. Their common characteristics are (a) use of extra space to preserve snapshotted data; (b) computing overheads imposed by snapshot management means during snapshot creation, operation or deletion, depending on particular technique; and (c) that these snapshots occur at the storage control layer transparent to the machine actively running on top of this data.

Differential snapshots are based on the idea of holding only the difference between the current data and point-in-time data corresponding to the moment of snapshot creation. The most known representatives of differential snapshot methods are "copy-on-write" (abbreviated to COW) and "redirect-on-write" (abbreviated to ROW) techniques. The COW technique makes a copy of original data only at the first time data are updated. No data are stored at the moment of snapshot creation yet a snapshot manager starts monitoring I/O writes on production storage. Once controlled data are to be updated the snapshot manager suspends an update operation, stores original data in an auxiliary storage and then resumes data update. If snapshot contents are requested, the snapshot manager takes unchanged pieces of data from a production storage while for changed pieces their original contents are retrieved from an auxiliary storage. At the deletion of a COW snapshot an auxiliary storage is abandoned and nothing is made on production storage. COW snapshots require no recycling period and, multiple COW snapshots can coexist at same time without affecting each other, though snapshots can also be controlled by the machine using the snapshotted volume.

U.S. Pat. No. 7,680,996 describes use of a differential snapshot and a watch-list structure in conjunction with identifying and retaining updated blocks to shrink a set of data in order to shrink the data set size when performing an incremental backup that is practical for bandwidth limited replication. However, this snapshot and backup mechanism assumes all components run on the operating system of the machine that is being backed up. The technique described in U.S. Pat. No. 7,680,996 requires retention of data in order to create a backup.

U.S. Pat. No. 6,131,148 describes performing a snapshot of storage media without requiring additional storage space to be directly allocated on that media. This method continuously sends changes to storage media to a secondary storage media in the form of an instantly-available snapshot. Unfortunately, this requires continuous reliable communications for continuous sending of snapshots and a secondary storage medium for storing the snapshots.

U.S. Pat. No. 7,072,915 describes the snapshot data using a copy method that supplements outboard data copy with a previously instituted COW logical snapshot to create a duplicate that is consistent with source data at a designated time. This patent describes a system that utilizes logic at a layer below the a logical volume manager, such as within a SAN, versus a mechanism that is directly available to software that runs as past of the hypervisor or as a guest of the hypervisor. This system enables making secondary copies of storage that contains potential inconsistencies and restoring that that storage to a consistent state as of the time of a snapshot, however it is not usable for updating the content of a remote secondary store to a future state.

United States Patent Application Publication Number 20090150885 describes examples of the use of snapshots. It is noted that snapshots are not actual copies of data. Instead, a snapshot is a means of accessing data to be consistent with the time that the snapshot was taken. Snapshots have been used with a copy on write (COW) file command, e.g., as described in United States Patent Application Publication Number 20090037680. Some backup systems, such as that described in United States Patent Application Publication Number 20080140963, look at the difference between two snapshots.

United States Patent Application Publication Number 2010005806 entitled "VIRTUAL MACHINE FILE SYSTEM AND INCREMENTAL SNAPSHOT USING IMAGE DELTAS" describes a file system aware method that partitions the file storage of a virtual machine into writeable and non-writable portions. However, this system is also suffers from the drawback of being "file system aware." File system awareness means that the implementation is specific to the OS and file system in use. File system awareness means that the result is based on knowledge of the content and higher-level use of stored information. Thus different implementations are required for each file system, and that as the rules of the file system change, the applicability of the backup method may also change. For example, a database may use its own file system to organize and access storage media, and at minimum a special implementation will be required, and the system must be aware of when this implementation method is required versus any other method.

United States Patent Application Publication Numbers 20080162841 and 20080162842 describe COW with the added detail of looking at the file system (and blocks as they pertain to the file system), which is one layer up. The goal is to take the knowledge the OS has about freed space and use that to optimize storage of blocks, that is, to remove blocks that the OS has freed from the local storage. Even if the data is "wrong", it doesn't matter because it's not part of the filesystem.

Some backup systems used with virtual machines make use of a file system and an incremental snapshot that uses image deltas, e.g., as described in United States Patent Application 20100058106. However, the system and method described therein does not perform incremental backups. Nor does it separate transient data which changes from persistent data or replicate a current virtual machine context so that it will run arbitrary applications without issue. Instead the system described in publication 20100058106 separates immutable data from changeable data but does not consider the context required to run a reconstituted virtual machine from backup data.

Some backup software is not able to determine the time at which backups take place. United States Patent Application Publication Number 20090300080 describes a method to track changes to a storage volume. The method described in Publication 20090300080 can find a specific change and correlate it to a snapshot in time. It uses bock metadata annotations to track changes. It also states that two change lists consecutively created in the tracking process can be obtained and subsequently used to create an incremental backup, as opposed to using a single change list to create a consistent incremental backup.

Some backup systems make use of block-based incremental backup. For example, United States Patent Application Publication Number 20070112895 describes a method for reading and writing data to a block store that resembles a "redirect-on-write" snapshot mechanism except it adds functionality and writes all data to the physical volume. It uses a table of block "birth" or modification times along with other metadata to determine how to read data, what to do to roll back changes, and which blocks to back up in each increment. The method states that modified blocks are not written over, but metadata is used to write the replacement data in new blocks in order to retain the original file systems content data prior to writing. This method has to do significant additional calculations to determine what needs to be backed up versus what does not. This mechanism adds significant overhead to the writing process of data. If the backup process defined herein were applied to such a disk, the backup would preserve all the additional metadata and prior content information in the backups, however the result would be inefficient for replicating that data over a limited bandwidth network.

Moving execution of a virtual machine generally involves making the virtual machine (VM) and its clients aware that the VM is running in a different network context or location, e.g., as described in United States Patent Application Publication Number 20080201455. When a machine is recovered, its clients need to be able to find and communicate with their server. Similarly, the recovered machine must be able to initiate connection to access resources as it did before recovery. Many machines are designed to work with the assumption that the machine resides on the same private network as the other resources it communicates with. In some cases, the other resources are programmed to only communicate with a specific IP address. In other cases the resources require a complete restart to communicate to a server at a different IP address. In addition, some applications statically include IP addresses inside their configuration. Intervening firewalls or routers will mean that any broadcast or local multicast mechanisms built into the application will not longer work, often causing clients to be unable to locate servers, invalidate caches, etc.

One limitation to virtual machines is that they often require that an application be "migration enabled" in order to migrate. United States Patent Application Publication Number 20090007147 describes an example of such a system. However, migration enablement requires a particular configuration of an application, which is often impractical for migration of existing applications that are not migration enabled.

Another disadvantage of existing virtual machine migration methods is that they often requires special mechanism for establishing client connections to a virtual. United States Patent Application Publication Number 20070174429 describes an example of such a system.

An issue related to virtual machines is storage management for a data center. International Patent Application Number WO2010030996 (A1) describes storage management for a data center but does not address machine migration or efficient storage movement across networks. Chinese Patent Application Publication Number CN101609419 focuses on copying machine memory in general, including by not limited to the data one storage media. However, this publication does not address issues of storage management or storage efficiency within or among data centers.

A topic related to virtual machines is the concept of a virtual private network (VPN). In a VPN two computers are linked through an underlying local or wide-area network, while encapsulating the data and keeping it private. United States Patent Application Publication Number 20040255164 describes a virtual private network between a computing network and a remote device that uses an intervening component in a carrier network that serves two clients. This system requires use of an intervening component and requires more than one component to act as a tunnel client.

Another topic related to virtual machines is that of encryption. For example, United States Patent Application Publication Number 20080307020 describes a method that is specific to using separate keys for a primary storage media for data, and different keys for backup copies of that data.

SUMMARY

Systems, methods, and computer program products are provided for deployment of a plurality of guest computing systems in two or more locations simultaneously. The scope of embodiments of the invention includes the individual components of the system, method, and computer programs that compose the backup, recovery, networking, license management, and security enhancements; the collection of some or all of these components into a single system.

One embodiment involves a computer implemented backup method for a computer system having a processor, a memory, and a data storage device. The backup method can be implemented by executable software running on the processor. According to the system and method of such an embodiment a list is recorded that identifies sectors within the data storage device for which content has changed beginning at a first time. A snapshot is taken of the data storage device at a second time that is later than the first time and storing the snapshot in the memory. Recording of the list stops at a third time subsequent to or coincident with the second time. A differences file is created using the snapshot and the list. The differences file contains the contents of the identified sectors. The snapshot can be deleted from the memory after the differences file has been created.

In another embodiment, a guest computing system performs information processing on one private network, and updates to the persistently stored image of the guest computing system are incrementally forwarded to a second location or network over a limited bandwidth network connection on a time schedule. The second location uses these updates to replicate the persistent state of the guest computing system. A system and method exists to determine availability of the guest at the first location, and to automatically run the guest within a second network. The guest system uses IP addresses associated with the first location, and the system and method preserves this by running the guest computing system as a network isolated entity tunneled inside the second network. Components on the first network will not see any change in IP address, therefore no added reconnection logic is needed on any client system of the guest computing system's applications. The embodiment optionally includes guarantees that the guest computing system will only run in one location at a time so that terms of licenses which restrict the quantity of instances are preserved. Optional security enhancements to the persistent data insure that access to a single physical copy of the guest system does not enable disclosure of the data used by that system. Finally, the embodiment assures guest computing system service continuity in case of network failure, hardware failure, or complete loss of the first location.

In another embodiment, a secure computing system may comprise one or more logical volume storage devices coupled to a processor and a memory. The storage devices retain data on behalf of one or more virtual machines. Data stored in the logical volume(s) on behalf of a running virtual machine can be encrypted by the storage device at block level using an encryption key. Data retrieved from the storage device can be decrypted from encrypted block level data on behalf of a running virtual machine using an encryption key. The contents of the storage devices can be incrementally backed up without decryption so that the data can be replicated elsewhere. The encryption key can be persistently stored at a location associated with an owner of the data in the virtual machines. The encryption key can be automatically or manually provided to the storage device according to policy, and only when the encryption key first used to access the stored data in unencrypted form.

BRIEF DESCRIPTION OF THE DRAWINGS

FIG. 1 illustrates a network architecture.

FIG. 2 illustrates an exemplary computing system.

FIG. 3 illustrates a virtualized computing system platform.

FIG. 4 illustrates a physical network architecture.

FIG. 5 illustrates guest computing system storage configurations, in accordance with one possible embodiment.

FIG. 6 illustrates the source side of a system and method for replication, in accordance with one possible embodiment.

FIG. 7 illustrates the receive side of a system and method for replication, in accordance with one possible embodiment.

DETAILED DESCRIPTION

FIGS. 1, 2, 3, and 4 illustrate a context for the description of embodiments of the invention.

Figure 1:
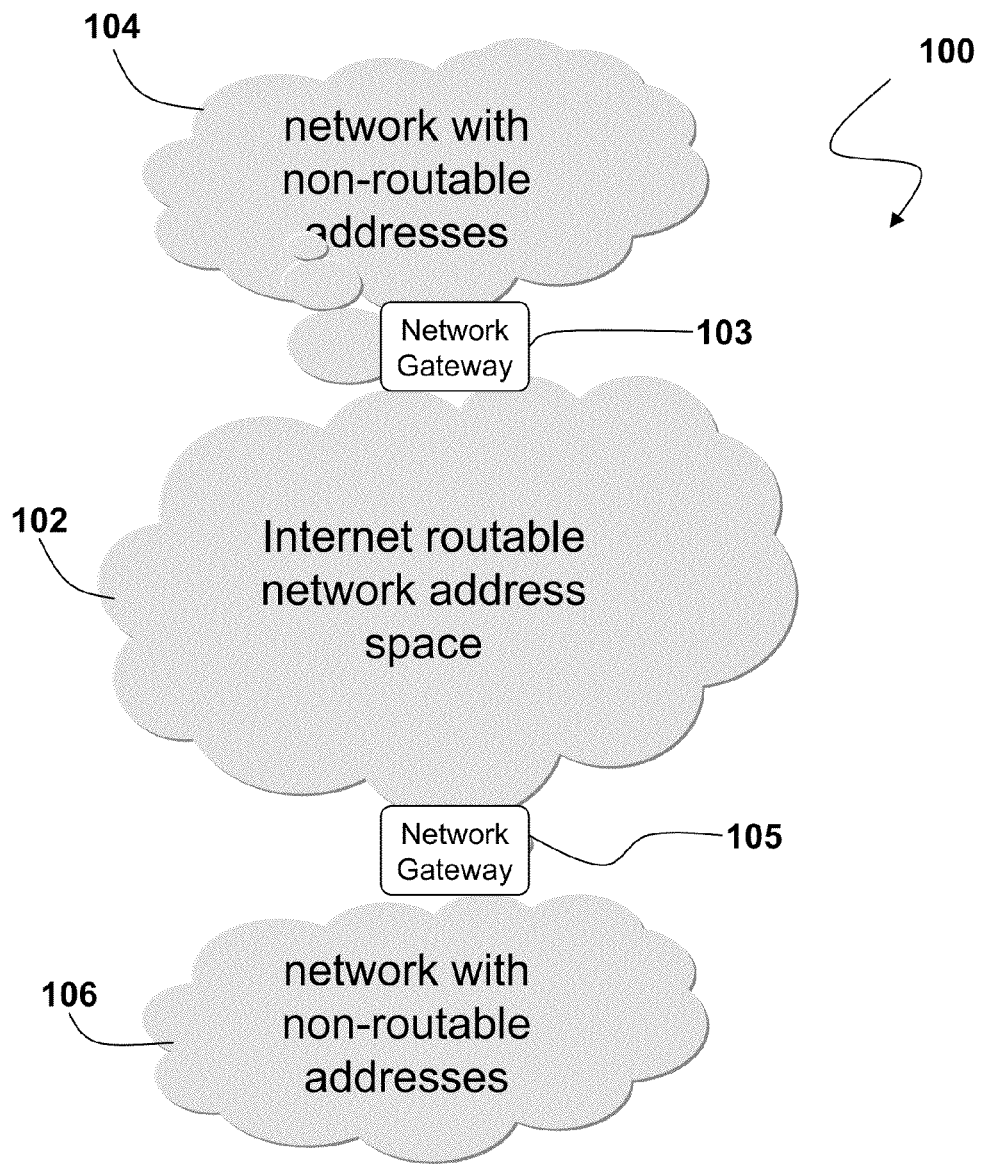
FIGS. 1, 2, 3, and 4 are the context for the description the invention.

FIG. 1 illustrates a network architecture 100, in accordance with one possible embodiment of the present invention. As shown, three networks 102, 104, and 106 are provided, with components on networks 104 and 106 connected through gateways 103 and 105 respectively that perform network address translations or other outbound IP address and port mapping onto network 102, and subsequently route incoming responses symmetrically. Gateways 103 and 105 may use specially configured means to map unsolicited incoming traffic to network addresses and ports in networks 104 and 106, respectively. Gateways 103 and 105 can also enforce security policies for their respective networks.

In the context of the present network architecture 100, the network 102 may take any form including, but not limited to an Internet Protocol v4 or v6 network layered on top of multiple Ethernet LANs, Wireless LANs, MPLS, ATM, such as the Internet, peer-to-peer network, cable network, etc. While only one network is shown, it should be understood that two or more similar or different networks 102 may intervene between networks 104 and 106, and that networks 102, 104, and 106 may collapse to a single network for a more trivial implementation within a single security zone, or networks 104 and 106 may be directly connected physically or via a tunnel. The term "private network" has a strict meaning relative to IANA and IPv4 network addresses that are not internet-routable. Here, "private network" can also refer to IPv6 networks or other networks that are effectively gated from other networks due to security or broadcast limits.

Figure 2:
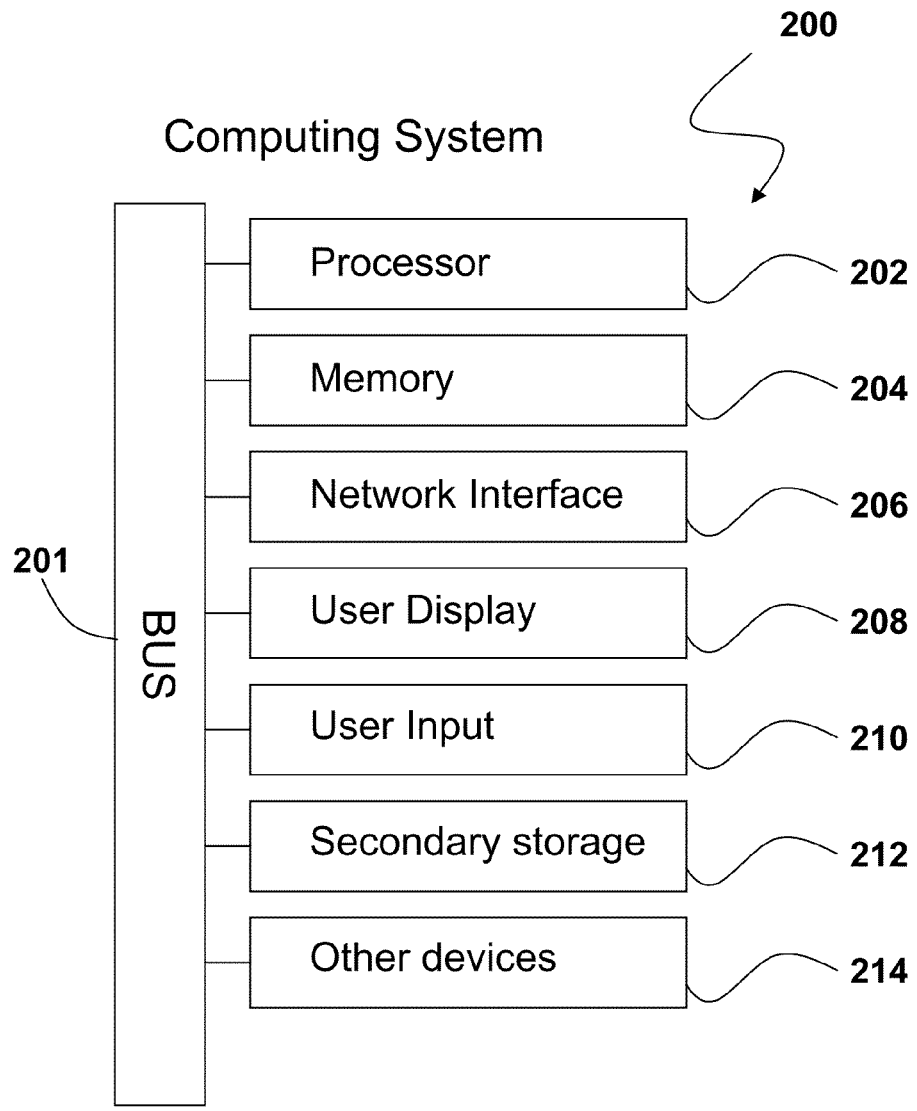

FIG. 2 illustrates an exemplary computing system 200, in accordance with one embodiment of the present invention. As an option, the system 200 may be implemented in the context of any of the devices of the network architecture 100 of FIG. 1. Of course, the system 200 may be implemented in any desired environment.

As shown, a system 200 is provided including at least one central processor 202 which is connected to a communication bus 201. The system 200 also includes a main memory 204 [e.g. random access memory (RAM), etc.].

The system 200 may also include a network interface 206, a display processor 208 and devices that accept user input events 210 (e.g., keyboard and mouse). The system 200 also includes a secondary storage 212. The secondary storage 212 may include, for example, a hard disk drive, flash drive, and/or a removable storage drive, representing a floppy disk drive, a magnetic tape drive, a compact disk drive, etc. Other ad-hoc devices with special behaviors can be connected to the bus via serial bus connections 214. Examples of such ad-hoc devices include, but are not limited to RS-232 or USB, devices such as scanners, video cameras, test telemetry, and the like. Each of these devices may have operating-system level drivers that adapt the bus technology to the device technology.

Computer programs, or computer control logic algorithms, may be stored in the main memory 204 and/or the secondary storage 212. Such computer programs, when executed, e.g., by the central processor 202, enable the system 200 to perform various functions (to be set forth below, for example). When the computer is operating, typically there is one instance of an operating system (such as Windows or Unix) running on the processor 202 and stored in memory 204 that allocates and co-ordinates resources. Memory 204, storage 212 and/or any other storage are possible examples of computer-readable media.

From the perspective of the processor 202 and memory 204, any of the components 206, 208, 210, 212, and 214 of the computing system can be performed by a device that logically resides on the bus 201, but actually does not directly connect to that bus. A device is physically attached to another remote bus which communicates to the bus 201 over the network interface. A driver translates the network data that it may then interact with operating system.

Within the context of this invention, a single computing system instance contains 1 or more processors 202, memory 204, secondary storage 212, and bus 206, as well as 0 or more of other devices.

Figure 3:
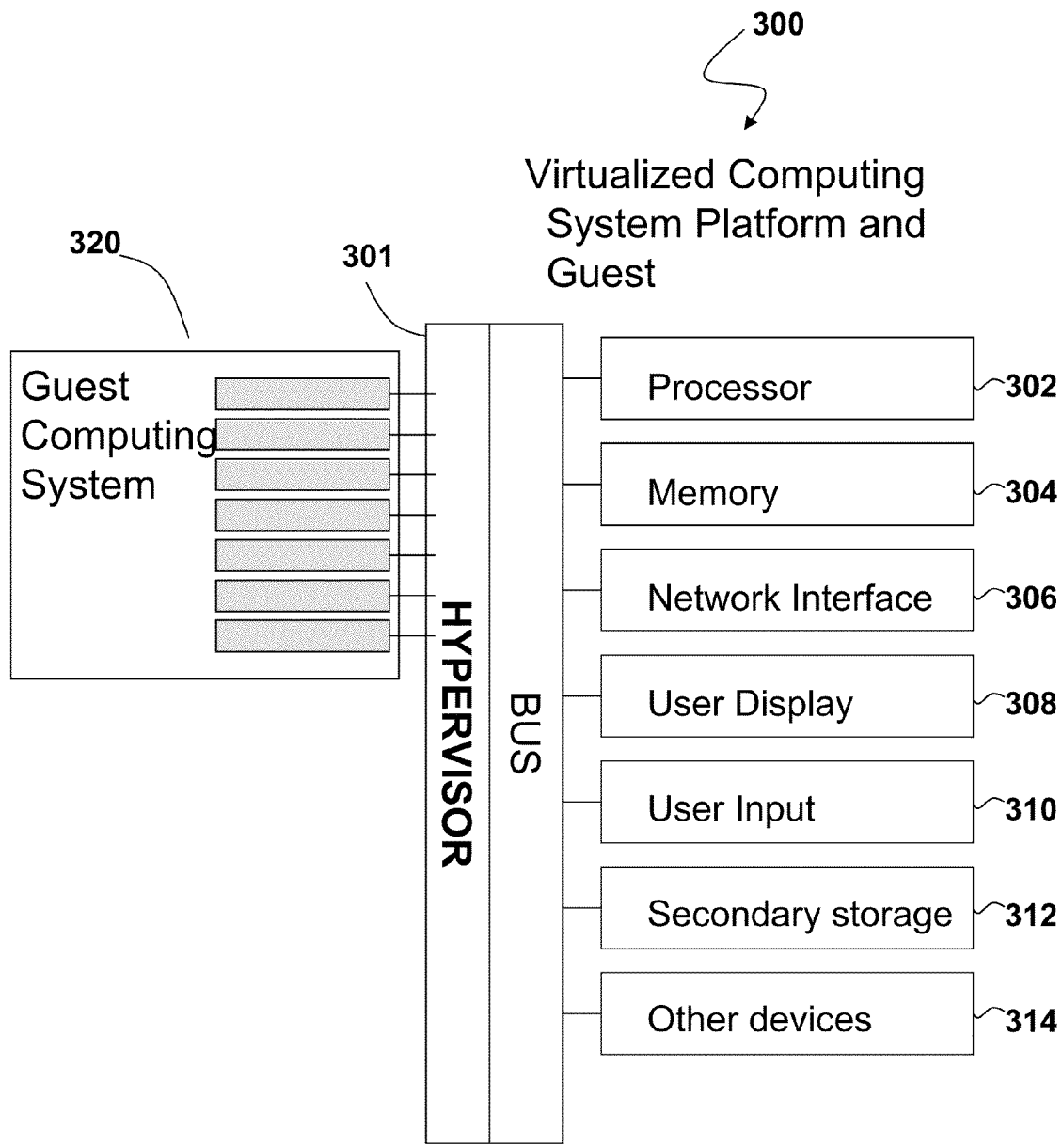

FIG. 3 illustrates a virtualized computing system platform 300 for running 0 or more virtualized computing systems. The virtual computing system platform is a special purpose computing system as defined in 200 above. The system 300 includes a hypervisor 301 that provides interfaces that appear as hardware interfaces to guest computing systems 320. The hypervisor 301 has drivers that mediate access to all system resources, and insures that the guest computing systems are functionally isolated. In some cases the hypervisor 301 may allow direct access to hardware for generic interactions, such as invoking instructions on a processor 302 (e.g., a CPU or other processor device), or it may make that access indirect, such as with network interface devices. The computing system 300 also includes a memory 304, Network Interface 306, User Display 308, User Input 310, Secondary Storage 312, and Other Devices 314.

On top of the hypervisor 301 are 0 or more guest computing systems 320. The difference between a guest computing system and a typical hardware-bound computing system is that the hardware interfaces as seen by the guest operating system are indistinguishable on all instances of the Hypervisor 302. The guest computing system is independent of the underlying hardware. This allows the guest computing system to be portable across a diverse multiplicity of computing hardware as long as the hardware has a compatible hypervisor. The predominant use of a guest computing system is to provide application logic or an information service as opposed to managing its own hardware.

As an option, the systems 200 and 300 may be carried out in the context of the network of FIG. 1. For the purposes of embodiments of this invention, the systems 200 and 300 and the methods described below with respect to FIG. 6 and FIG. 7 may be carried out in the context of a network as described in 100. Embodiments of the invention are applicable to a multiplicity of combinations of computing systems and networks, and provides varying degrees of utility depending on the context.

Figure 4:
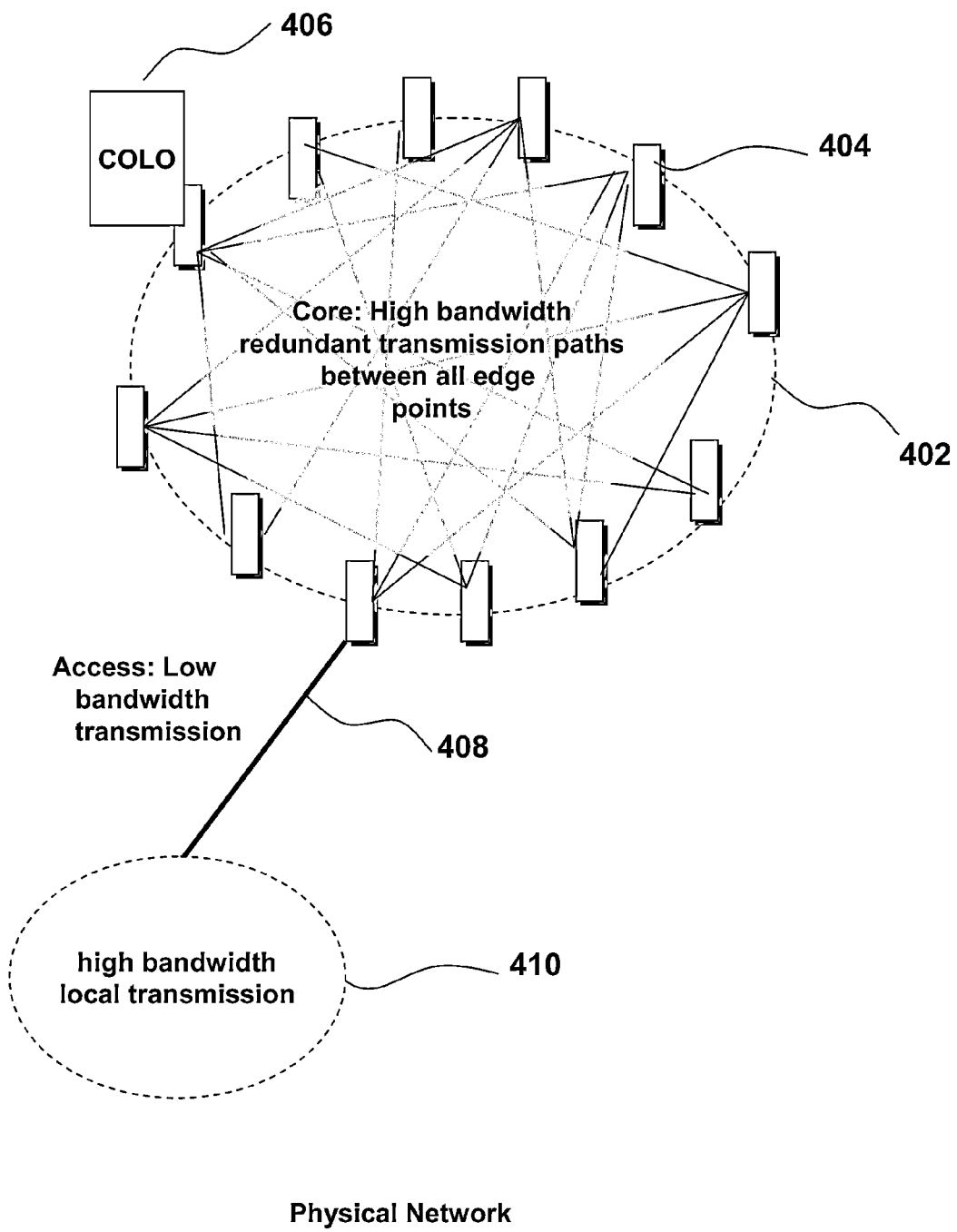

FIG. 4 illustrates a possible embodiment of physical networks which can incorporate embodiments of the present invention. In the example illustrated in FIG. 4, the core of a network 402 is composed of high-bandwidth connections among many points of presence 404, and uses many routing mechanisms and layering on top of many technologies. Examples include MPLS, SONET, Gigabit Ethernet, ATM, Microwave connections. This kind of physical network is exemplary of the network 102 of FIG. 1. Entities 410 external to the network 402 may have low bandwidth transmission access 408 to the core of the network via the points of presence 404.

Referring again to FIG. 1, the networks 104 and 106 can also be high speed networks. Internally they may have 100

BT, Gigabit Ethernet, 54 MB/sec wireless and other technology that is cost effective for transmission within close proximity. For example, Network 104 could be at a collocation center (also referred to as a COLO), a place which is physically in close proximity to a point of presence (POP) 404. A COLO (sometimes called a carrier hotel) is generally understood to refer to a type of data center where multiple customers locate network, server and storage gear and interconnect to a variety of telecommunications and other network service provider(s) with a minimum of cost and complexity. As used herein, a POP generally refers to an access point to the network 402. A point of presence is generally a physical location that can house servers, routers, asynchronous transfer mode (ATM) switches, and/or digital/analog call aggregators.

In this case the transmission of network information can occur at high speed between networks 102 and 104.

As another example, network 106 could be some distance from a POP, and require additional access network transmission components to interconnect the networks 102 and 106. The physical embodiment of the gateway links 103 and 105 may include a network router, layer three Ethernet switch, or other technology that maintains policies associated with controlling traffic that traverses the link. Unless the gateway links are collocated with a point of presence or other high bandwidth connection, they typically also require physical connections using lower bandwidth ADSL, SDSL, T1 network transmission technology.

The terms high bandwidth and low bandwidth are common terms, with low bandwidth generally being between 512 Kbits/sec and 3 Mbits/sec and high bandwidth being above this range. Low bandwidth as used above is relative to currently deployed access network technologies and price structures. Low bandwidth is also relative to the needs for replicating information in real time over the network. The semantics of a low bandwidth link would, for example, indicate the link is inadequate for a typical computing system 200 (such as a Windows PC) where the secondary storage 212 was linked to the computing system bus 201 via a low bandwidth network connection.

Figure 5:
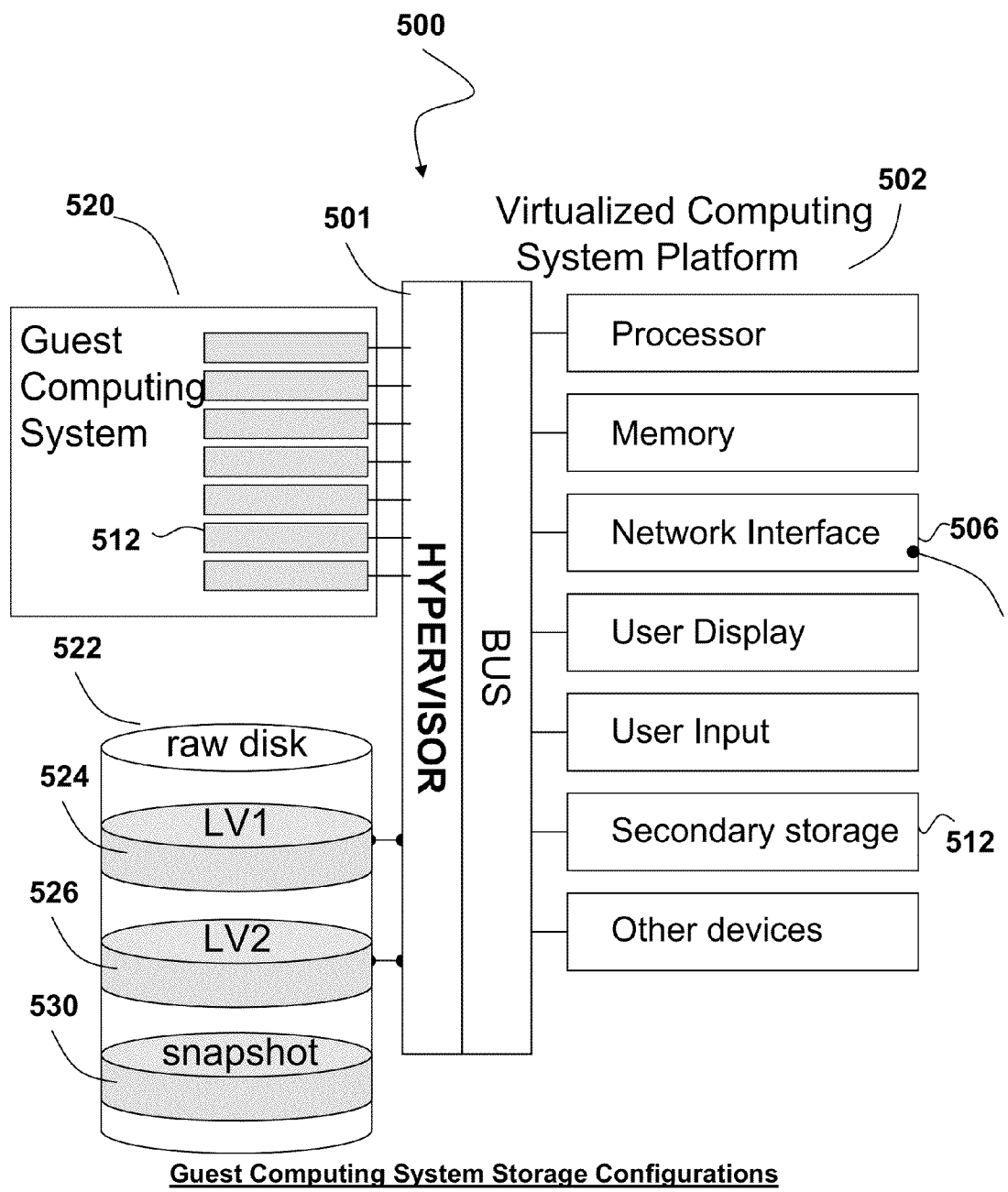
FIGS. 5, 6, and 7 describe in detail the independent invention of a real-time method, system, and computer program for maintaining two remote copies of the persistent store of a computing system.

FIG. 5 illustrates multiple combinations 500 of a Guest Computing System 520 and a secondary storage 512 it runs on as provided by a virtual computing system platform 502 via its hypervisor 501. These combinations 500, guest computing system 520, and secondary storage may be as described above with respect to components 300, 320 and 212 respectively in FIGS. 3 and 2. It is noted the specific components of the guest computing system 520 can be different for each implementation. For example, in a trivial case, the guest computing system 520 can have a secondary storage 512 that is read-only, and includes the instructions required to run the operating system for the guest computing system 520. If the secondary storage is known by the hypervisor 501, the storage appears as a physical disk to the guest computing system's operating system. The secondary storage can also appear as a network streamed device available over a network interface 506, however this option also requires the Hypervisor 501 to provide a boot loader, instructions and the network interface in some executable form prior to starting such a guest computing system.

In another more typical embodiment of a guest computing system 520, disk space 522 can be controlled locally by the hypervisor 501. The hypervisor can be configured to allocate some portion 524 of the disk space 522 for read-write use by the operating system that runs the guest computing system 520. During setup and at run time the guest operating system partitions and accesses this space as if it were a system dedicated physical disk. When the Guest Computing System 520 is not running, the contents of the disk space portion 524 provide a complete record of the state of the Guest Computing System 520. When running, the state of the Guest Computing System is the combination of information in the memory, the processor and secondary storage 524.

In yet another embodiment of a guest computing system, disk space 522 can be allocated locally by the hypervisor 501. The hypervisor is configured to allocate two distinct portions 524 and 526 of the disk space 522 for read-write storage components of a guest computing system 520. The two portions 524, 526 appear as two disks to the Guest Computing System's operating system, and both are required to run the guest computing system. Alternatively, a secondary storage space may be interfaced to the guest computing system as a disk partition for use as a file system, swap space, or other space that requires persistent physical storage. The portion 526 could be used, e.g., for swap space that is not replicated. It is noted that the disk space 522 is in general, logically separate from the secondary storage 512 but could be part of the same physical device or could be connected to the device by a local area network.

In yet another embodiment, the guest computing system's secondary storage could be available over the network 506 to the hypervisor 501. The hypervisor can make this space available to the guest computing system 520. The secondary storage space may be interfaced to the guest computing system as, for example, either a raw disk, as a disk partition, or as a file system.

In general, a guest computing system 520 can utilize any number of any combination of the above secondary storage mechanisms. Secondary storage may also include removable and shared media, however the contents of that media are not considered part of the guest computing system itself. For simplicity, embodiments of the invention is described below based on a guest computing system that interfaces to secondary storage in the form of one or two raw disks.

One self-standing element of an embodiment of the present invention is the ability to synchronize a remote copy of a running guest computing machine. Although prior art systems exist that are able to perform this task using other systems and methods, such systems cannot do so in a way that will work with limited bandwidth, does not require any special additional hardware, can maintain synchronization within single digit minutes, and can be built from open source components and alternatively also work with proprietary hypervisors.

By way of example, and not by way of limitation, an embodiment of the invention can be implemented using Linux Logical Volumes interfaces, where the Linux Logical Volume mechanism is used to allocate space and control access to the physical secondary storage devices. The mapping of the logical volumes to physical storage space can occur at a layer outside the scope of the invention. The Linux Logical Volume can be interfaced to as a raw disk, and has no notion of file systems or other operating-system dependent concepts. A guest computing system's secondary storage may still be at the partition or file system levels, with these secondary storage abstractions built on top of logical volumes.

Additional properties of the logical volume mechanism are that it can perform "snapshots" 530 where "copy on write" tables or "COW"s are recorded on disk. The typical purpose of a snapshot is to retain a usable copy of the volume at a given point in time. If the secondary data is modified in an undesirable way, a snapshot can be used to restart the system at the previous state. The typical use of a snapshot is to enable backup of a running machine. Because backup takes time, a snapshot provides a consistent view of a disk frozen in time. As writes are performed on the actual master volume after the snapshot is initiated, the ability to access data as it was at the time of the snapshot and as currently updated are both preserved. The snapshot does not contain a copy, but contains the information and interfaces so that in combination with the original volume it will act like the original volume. When accessing disk information through the snapshot instead of the logical volume directly, the data as frozen in time is reported.

Embodiments of the invention use the copy on write table stored as part of a snapshot for an unintended purpose. Embodiments of the invention include a method and computer program that determines the updated records on the raw disk and uses them to update other copies of the disk. The differences are guaranteed to consist of only the changes that occurred between two snapshots. Because of the consistency requirements on snapshots themselves, the computed differences will consist of whole disk writes thus guaranteeing integrity.

Creating Content for Backup or Remote Replication.

An inventive system and method for creating the content to be remotely replicated can be implemented with systems of the types shown in FIG. 1 through FIG. 4. The system and method may work as follows. Suppose at some point in time t0 there are two distinct copies of data on disparate storage devices A and B (at Location A and Location B, respectively), with the storage device B at location B being write-locked. At time t0 a change-list starts recording a list of all sectors that have been modified on storage device A since t0 and stores the list in a first file. Unlike a snapshot, the actual changes to the data need not be captured or copied. Only the block numbers of the blocks that have been modified are recorded, no time stamps or content for these blocks are recorded.

At some future time t a second file is created containing the new data stored on storage device A since time t0 from the block numbers in the first file. To determine this, the elements in the stored change-list can be read from the current contents of storage device A. To keep the state of device A consistent while being written, a snapshot of the storage device A is taken at t. This snapshot is merely used to provide a consistent view of storage device A.

At some later point in time t+ epsilon, recording of the change-list is stopped. The change list is not assumed to align in time or content with any snapshot. The change list may include more blocks than were actually changed between t0 and t. Then the content at time t for each sector in the change-list can be retrieved from the snapshot, and written to an incremental backup file. The snapshot of time t can be discarded after this process. As the time difference between time t and time t+ epsilon becomes smaller, fewer unnecessary data sectors are included in the backup file, which can be sent to storage device B so that the content of storage device A can be replicated.

The above system and method provides a single backup. To keep storage devices A and B consistent over time, the steps performed at time t0 (i.e., starting recording of the change list) and at time t (i.e., creating the second file and taking a snapshot) can be repeated at time t0' and t', with the constraint that t0' occurs before or concurrent with time t', and t0' occurs after time t0, and time t' occurs after time t. The smaller the time delta between times t0' and t, the less redundant data is included in the backup file thus greater performance.

A preferred implementation optimizes the implementation by having t0'=t for each new incremental backup file. In this situation the contents of the copy-on-write table for the snapshot used for creating the backup file includes the change-list to be used in the building of the next backup file. Specifically, the block numbers for which content has been changed can be determined from the COW table for a snapshot. These block numbers may be recorded and the snapshot can be deleted afterwards.

It is noted that, this system and method does not send any signal to the system to be backed up in preparation of a backup. Instead, the backup is transparent to the application. It is further noted that this system and method does not look at the file system (and blocks as they pertain to the file system). Instead, the algorithm is fairly simple—it only looks at modified disk blocks, and then takes the modified disk blocks, optionally compresses them without loss (e.g., using bzip2 compression), and ships the blocks (or compressed blocks) to another system for remote replication or saves them for local backup. Furthermore, the backup system and method is file system unaware.

Figure 6:
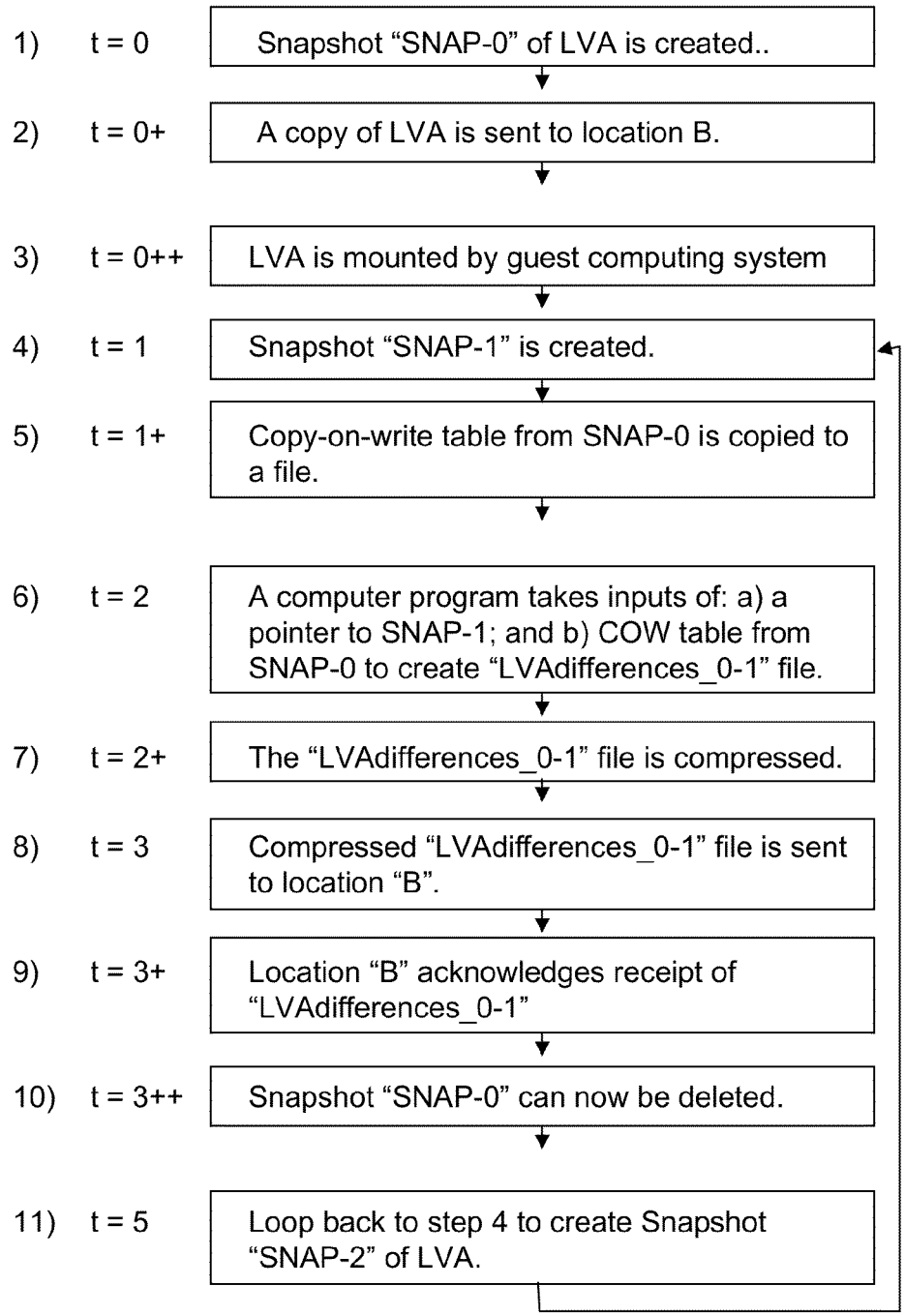
Figure 7:
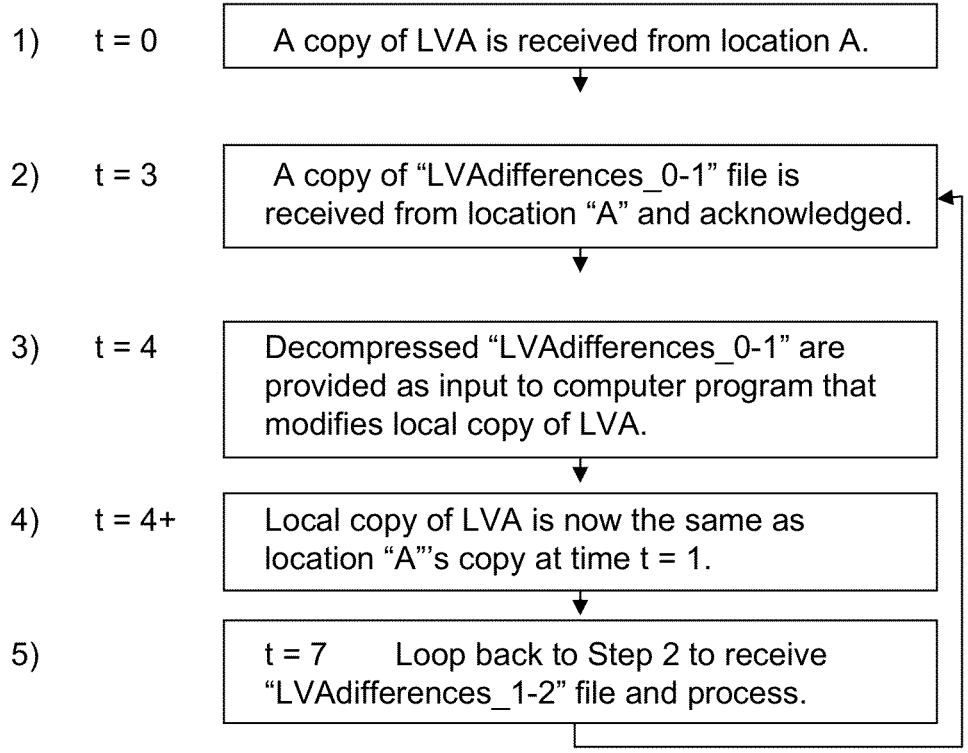

FIGS. 6 and 7 together illustrate an example of this process in greater detail. FIG. 6 diagrams an embodiment of the source-side of the real-time guest computing system replication. This occurs in location A. FIG. 7 diagrams the receive-side of the real-time guest computing system replication. This occurs in location B. Together they form a method and system that can use Linux logical volumes and snapshots as an interface to raw disk areas.

FIG. 6 illustrates the process performed on the running server at location A. At time t=0 the guest computing system is not running. A snapshot of $LVA_{t=0}$) called "SNAP-0". Then at time t=0+an intact copy of $LVA_{t=0}$ is sent to location B. Given the size of these files, often tens of gigabytes, this task can take a significant amount of time over a low bandwidth access network.

In FIG. 6 at time t=1 a second snapshot called "SNAP-1" is created. The steps that follow at t=1+, t=1++, t=2 result in creating a file to be used later to modify the copy of $LVA_{t=0}$ at location B so that it is exactly the same as $LVA_{t=1}$ was in location A. The next step at time t=1+a copy of SNAP-0's copy on write table is saved in a persistent way. Once saved, SNAP-0 is no longer needed, and can be deleted at some time after t=1+. In some embodiments SNAP-0 can be saved until after t=3 to improve failback timing properties instead of deleting it now for local disk write performance reasons.

At time t=2 a computer program is used to create a differences file LVAdifferences_0-1 that can be used to synchronize the logical volume contents stored at location B. As inputs the programs takes (1) the COW table for SNAP-0 to get a list of modified disk records; (2) a pointer to access the logical volumes contents at t=1, with is also called "SNAP-1". For each record that was changed, the program determines the contents of that record at time t=1. It then writes the record number and record contents to output the LVAdifferences_0-1 file to be sent to location B for updating the copy of the LVA there. In this embodiment the LVAdifferences_0-1 file format is similar to the format of the Linux logical volume COW table.

In the typical embodiment bandwidth utilization is the key constraining factor, so the contents will be compressed either record by record by the computer program, or compressed as the output file from the computer program as a single step. Short term secondary storage I/O bursts that might affect guest computing machine performance can be avoided by compressing the output before writing it to network-available storage reachable with high bandwidth.

At time t=3 the output LVAdifferences_0-1 file is ready to be transferred over low bandwidth links to location "B: Best practices of this invention include another computer program that manages these uploads so that bandwidth is left for other tasks, and to insure that higher priority data is transferred before lower priority data. At minimum this upload manager computer program must be able get verification from location B that the output file was received intact.

At time t=4 another snapshot is taken, called "SNAP-2", and the process repeats itself. The same steps that were performed at times t=1 through time t=3 are repeated over and over again.

In this process the guest computing system is not suspended. Disk writes are flushed to insure consistency prior to initiating each new snapshot. This behavior is part of the logical volume manger itself, and independent of the hypervisor and guest. It can be applied to traditional computing systems that reside directly on hardware. The quality of the backup is equivalent to that of a power outage where the disk controller and disk have a battery backup and the logic to flush all in progress writes to disk prior to a safe power-down.

FIG. 7 illustrates the process performed on the backup end of the process at location B. At time t=0+a copy of the entire logical volume LVA for the guest computing system is received and acknowledged. At time t=3+the differences file LVAdifferences_0-1 is received, and receipt is acknowledged. At time t=4 or later a computer program takes the compressed differences file LVAdifferences_0-1 as input, and applies changes to locations B's copy of $LVA_{t=0}$ so that the result is $LVA_{t=1}$. The cycle then repeats itself.

It is noted that the system and method described above with respect to FIG. 6 and FIG. 7 does not consider block birth or modification dates, retain original data blocks, or use a watch list of blocks. Furthermore, the system and method described herein does not continuously send data. Instead the system and method only sends update data adequate to update a secondary (remote) copy. This update data is bulk merged directly on to the secondary media. The system and method relies on the fact that the system at location A knows only the identities of changed blocks, and that we have a have two so that we don't add extra data into a given snapshot. In this process my invention utilizes a single snapshot only as a means to insure that a consistent set of changes are backed up.

The method and system of embodiments of the present invention can be implemented without temporarily pausing a disk volume and restoring the disk volume afterward.

The basic synchronization system can be further augmented with nightly checksums to validate images, and the ability to recover to a multiplicity of possible backup states. The frequency of update can be adjusted based on needs and available bandwidth, too. However, as the time scale gets shorter, it is likely that the average bandwidth required will get higher as more re-writes will be replicated for the same record.

The invention can be further augmented to reduce update file size and the resulting bandwidth consumption by various techniques to avoid sending updates for swap or page file space, as well as for anything written to temporary directories such as /var/tmp in Linux or C:\Windows\Temp in windows. However, each of these approaches requires some knowledge of the operating system.

If a second logical volume for a Linux guest computing system contains the swap space and an empty filesystem for /var/tmp, this second logical volume does not need to be backed up or continuously synchronized. To start the Linux Guest computing machine, a copy of the first logical volume is needed, and a second logical volume can be generically created just in time for swap and "tmp" files, or be copies of stale versions of these partitions. This would have to be an a-priori known convention, and the guest computing machine modified to be consistent with this convention. This approach can be used in routing for Unix operating systems. However, no file system specific knowledge is used by embodiments of the invention for this optimization. Another approach using a single logical volume has the differences program look at the partitioning of the raw disk image, and when it sees a swap partition, it notes the physical extent of that partition, and does not provide updates for any of the data written to those records. This second approach requires file-system level knowledge to determine the static extent of swap space.

Similar conventions can be applied to Windows, where the files "pagefile.sys" as well as the % TEMP % directories are on a separate logical volume, or the physical extent of these ".sys" files can be identified at boot time so updates to the sectors allocated on the disk within these files are not included in any difference files. It is acknowledged that by taking advantage of deeper attributes of each specific operating system, further bandwidth reductions can be gained at the cost of complexity and specificity to the operating system of the virtual machine being replicated.

It is noted that knowledge of specific changes to low level storage to media as blocks has typically been within the storage media hardware. The simple notion of "remembering a list of changes" at the media block level has not been directly exposed until the advent of logical volume managers that act as hardware machines. It is further noted that merely knowing a list of block changes does not guarantee consistency of a backup record at the file system level. To guarantee consistency the list of block changes must be trimmed in some way that is based on knowledge of a known step where a file write completes. Storage backup and replication as set forth in embodiments of the present invention show how consistency of a backup record can be guaranteed at this simple level of data in a way that is transparent to the physical storage system and transparent to the machine accessing and writing the stored data.

Figure 8:
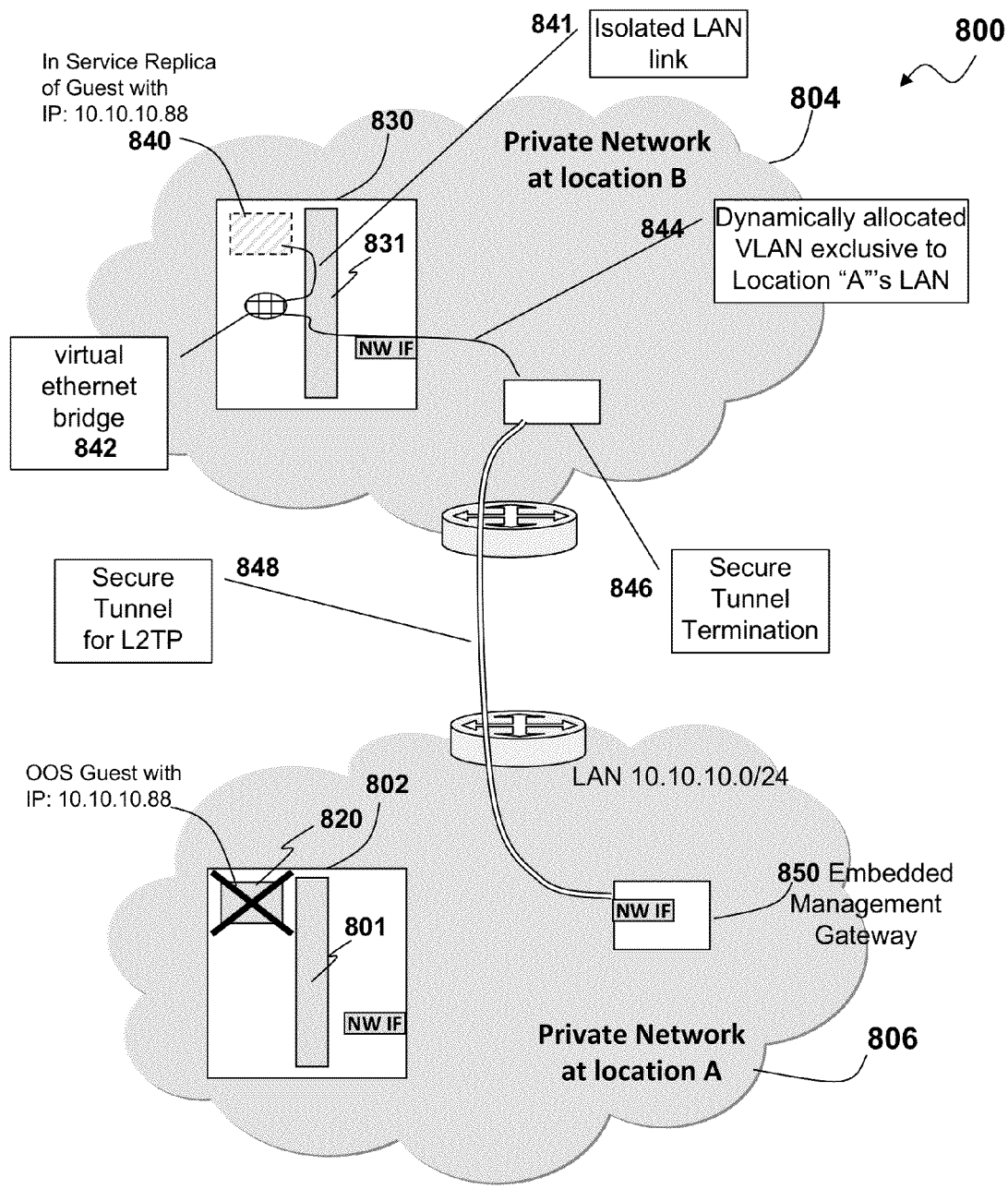
FIG. 8 illustrates a system of network details to run a guest at a remote location B, in accordance with one possible embodiment.
Figure 9:
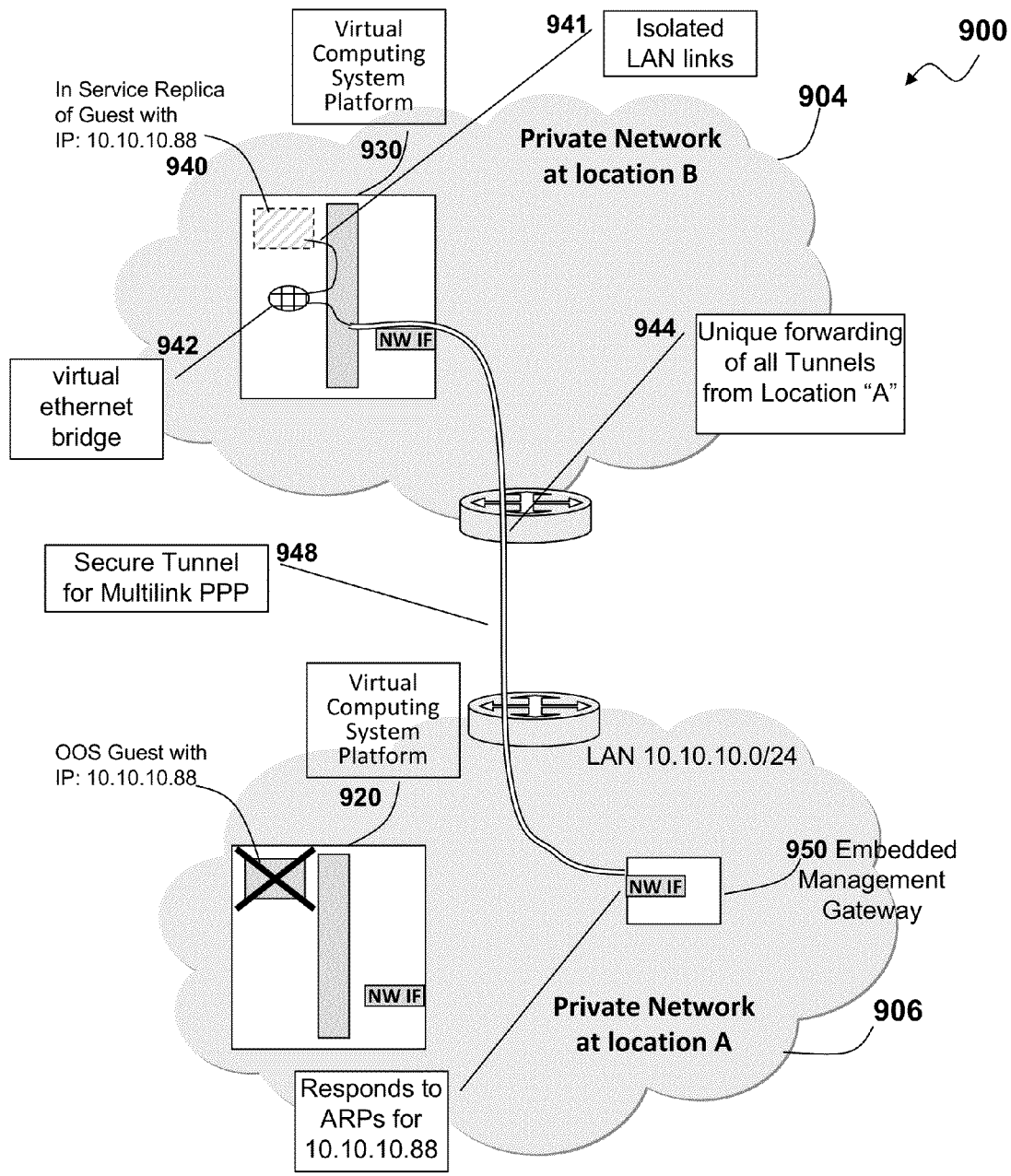
FIG. 9 illustrates a system of network details to run a guest at a remote location B, in accordance with another embodiment.

FIGS. 8 and 9 is a schematic diagram illustrating embodiments of the present invention that virtually put the computing system on the origin network retaining full network context.

The utility of this network configuration is to minimize network configuration impact at location A to avoid the requirement for technical review, reconfiguration, or other equipment changes. FIG. 8 illustrates components of a system 800 for implementing network connectivity between networks at location A 806 and location B 804. Location B 804 must be network reachable from inside of the network at location A either directly or via forwarding, but the reverse does not need to be true. The network configuration allows address ranges in A, B, and any in-between networks to overlap.

Embodiments of the present invention allow an application to be implemented over a network on multiple guest computing systems while only a single copy of the guest computing system application resides on any computing platform at any given time. This allows virtual computing to be implemented within the context of existing licenses, which often allow an application to be run on only one machine at a time. By way of example, in FIG. 8 an instance 840 of a guest computing system 820 resides at location B on a virtual computing system platform 830 with a hypervisor 831. As used herein, an "instance" of a guest platform refers to an in-service replica of a guest computing system that originated at a different location. The platform 830 can be connected to a private network 804 at location B. When running on a virtual computing system platform 802 with hypervisor 801 on a private network 806 at location A the guest 820 natively uses an IP address allocated from the LAN at location A. When running in location B, the instance 840 of the guest 820 would retain the IP address it was using at location A. When the instance 840 is running at location B, a copy of the application software for guest 820 resides at location B (e.g., on platform 830) but not at location A. Similarly, when the guest 820 is running at location A, a copy of the application software for guest 820 resides at location A (e.g., on platform 802) but not at location B.

In a preferred embodiment, the hypervisors 801 and 831 can have the same configuration and infrastructure. This avoids having to convert the instance 840 to run on a different hypervisor at location B. Alternatively, a management gateway 850 may "convert" the replicated system 840 so that it can run on heterogeneous hypervisor infrastructures.

In another embodiment, the guest system 820, the hardware and software for the virtual computing platform 802, and optionally software media and certificates of authenticity of software included in the guest system 820, may be physically delivered to the location A together or separately.

The default behavior is that the instance 840 of the guest 820 is started at location B only when the Embedded Management Gateway 850 has set up a tunnel 848 to a computing system 846 on the network 804 at location B that terminates the tunnel. By way of example, the tunnel 848 may be set up according to a suitable protocol, such as level 2 tunneling protocol (L2TP). System 846 and embedded management gateway 850 in this example embodiment can be implemented on a basic Linux server with stunnel, openssl, L2TP, VLANs, and generic routing capabilities loaded and configured. Standard commercial routers can perform these tasks, too. Additionally, system 846 and gateway 850 may include computer programs that automate the provisioning process, or make requests from an authentication server, such as Radius.

At the time the network tunnel is set up an Ethernet VLAN tag is allocated for a virtual LAN (VLAN) 844 connected to the system 846. The VLAN 844 is dynamically allocated and is exclusive to the network 806 at location A. If a VLAN has already been established for location A, then the new tunnel can be terminated to the preexisting VLAN.

As part of the startup process for an instance 840 of the guest 820 a virtual private Ethernet bridge instance 842 is created on virtual computing system platform 830. The physical network connection on virtual computing system platform 830 is configured to forward all traffic from the VLAN 844 to the private Ethernet bridge instance 842, as well as the reverse. Similarly, the virtual network interface 841 on the instance 840 of the guest 820 is also exclusively connected to the private virtual Ethernet bridge 842. The bridge 842 is configured to functionally isolate guests such as 820, 840 and their network traffic to a segment of network 804 that is virtually part of the network 806 at location A.

In a preferred embodiment, the management gateway 850 can be implemented as a separate hardware component that is distinct from the virtual computing system platform 802. Alternatively, the management gateway may reside as a different guest on the platform 802 with the same host hypervisor, however this leaves the host platform as a single point of failure. It is noted that if the management gateway 850 were to fail, backups, etc. can still proceed, however remote recovery may not occur seamlessly.

The management gateway 850 can be located at a data-owners premise, and can transparently enable consistent access to virtual machines whereever they physically reside. Replication can be implemented separately from the management gateway 850. The gateway 850 only needs to know where copies of data that represents virtual machine instances reside that can be made runnable or accessible. Replication of the data may be implemented by a separate replication system, which may be implemented by the virtual computing system platform 802 or by a separate hardware component on the network 806 at location A.

Many aspects of the embodiment of FIG. 8 can be straightforwardly replaced. For example, the location B may be one of a multiplicity of locations or networks. Furthermore the VLAN 844 used at a location can be one of many physical Ethernet LANs at that location. Additionally, the portions of or entire functionality of the collection of components in location B can be shrunk to fit on a single computing system. Technologies such as SSL and l2tp are replaceable by other equivalent technologies. And there can be multiples of every physical component so that if a component fails, recreation of a tunnel or restarting of a guest is all that is needed to resume service through an alternate physical machine or network.

All solutions have in common an isolated virtual bridge 842 which is virtually a part of the network 806 at location A alone. That bridge might require specialization if the guest differentiated traffic across multiple VLANs itself. For this use case the l2tp tunnel would need to be terminated on the virtual computing system platform 830 without need for the intervening VLAN. Similarly, if an instance 840 of the guest 820 connects to two or more networks isolated from each other on separate physical interfaces, then an additional bridge and tunnel will be needed for each isolated network.

The embodiment illustrated in FIG. 8 allows that outbound requests from instance 840 may be configured to route directly to publicly routable IP addresses without traversing the tunnel 848 back to location A. These optional policies can be configured on system 846.

The elements of the network path of FIG. 8 are methodically created, and can be incorporated into a distributed computer program that performs flow through provisioning. Network resources can be allocated and released as needed.

FIG. 9 illustrates components in another embodiment of a system 900 for implementing network connectivity between networks 906 and 904 respectively located at location A and location B. Connectivity requirements and guest are the same as in FIG. 8. Location B must be network reachable from inside of network "A" either directly or via forwarding, but the reverse does not need to be true. The network configuration allows address ranges in A, B, and any in-between networks to overlap. An instance 940 of a guest computing system 920 can reside on network 904 at location B, e.g., at a virtual computing system platform 930 having a hypervisor 931. The guest computing system 920 can run at either location A or location B, but a copy of the application software for guest computing system 920 only resides at the location where it is running. When running in location A 906, e.g., on virtual computing system platform 902, the instance 940 of the guest 920 natively uses an IP address allocated from the LAN at location A. When running in location B, it retains the IP address it was using at location A.

The default behavior is that the instance 940 of the guest 920 is started at location A only when the Embedded Management Gateway 950 has set up a secure tunnel 948 to the virtual computing system platform 930 that terminates the tunnel 948. By way of example, and not by way of limitation, a router 944 on network 904 may be configured to implement unique forwarding of all tunnels from location A.

Virtual computing system platform 930 and embedded management gateway 950 in this example embodiment may include Linux server packages stunnel, openssl, PPP, and generic routing capabilities. Because PPP is a layer three tunnel, this network has limitations regarding layer 2 broadcasts such as handling of DHCP. It is possible that the management gateway 950 can compensate for such limitations. Additionally, 930 and 950 may include computer programs that automate the provisioning process, or make requests from an authentication server, such as Radius.

As part of the startup process for the instance 940 of guest 920, a virtual private Ethernet bridge instance 942 is created on virtual computing system platform 930. The physical network connection on 930 only sees the secure tunnel 948. The location B side of the PPP connection is terminated at the bridge instance 942 using multilink PPP. The virtual private Ethernet bridge instance 942 is connected to instance 940 via network isolated LAN links 941. In some cases, in order to insure equivalent networking, 920 and 930 may include an additional computer program that announces IP address movements and responds to ARP who-has broadcasts for those IP addresses. The computer program may also retain dynamic host configuration protocol (DHCP) leases on the 906 network behalf of the instance 940. IP broadcast packets may also require manual routing over the link if they are required for proper application operation. The virtual network interface on instance 940 of guest 920 is also exclusively connected to the private virtual Ethernet bridge 942. The network is defined to functionally isolate guests such as instance 940 and their network traffic to a segment that is virtually part of the network at location A.

As in the embodiment in FIG. 8, many aspects of the embodiment of FIG. 9 can be straight-forwardly replaced. For example, the location B may be one of a multiplicity of locations or networks. Furthermore the portions of or entire functionality of the collection of components in location B can be shrunk to fit on a single computing system. Additionally technologies such as SSL and PPP are replaceable by other equivalent technologies. And there can be multiples of every physical component so that if a component fails, recreation of a tunnel or restarting of a guest is all that is needed to resume service through an alternate physical machine or network.

All solutions have in common an isolated virtual bridge 942 which is virtually a part of the network at location A alone. That bridge might require layer 2 or layer 3 switching capabilities if the guest communications differentiated traffic across multiple VLANs. For this use case a single PPP tunnel could be implemented with significant complexity, but the solution of having multiple PPP tunnels is simpler.

Similar to FIG. 8, the embodiment of FIG. 9 allows that outbound requests from instance 940 may be configured to route directly to publicly routable IP addresses without traversing the tunnel back to location A. These optional policies are configured on 930. The elements of the network path of FIG. 9 are methodically created, and can be incorporated into a distributed computer program that performs flow through provisioning. Network resources can be allocated and released as needed.

In the systems 800 and 900 a virtual machine and its clients is unaware that it is running in a different network context or location. The systems 800 and 900 use no special mechanisms for establishing client connections to a virtual server. It is noted that the systems 800 and 900 do not use an intervening device between networks and only one component acts as a tunnel client. Furthermore, systems 800 and 900 can run arbitrary applications without issue.

Figure 10:
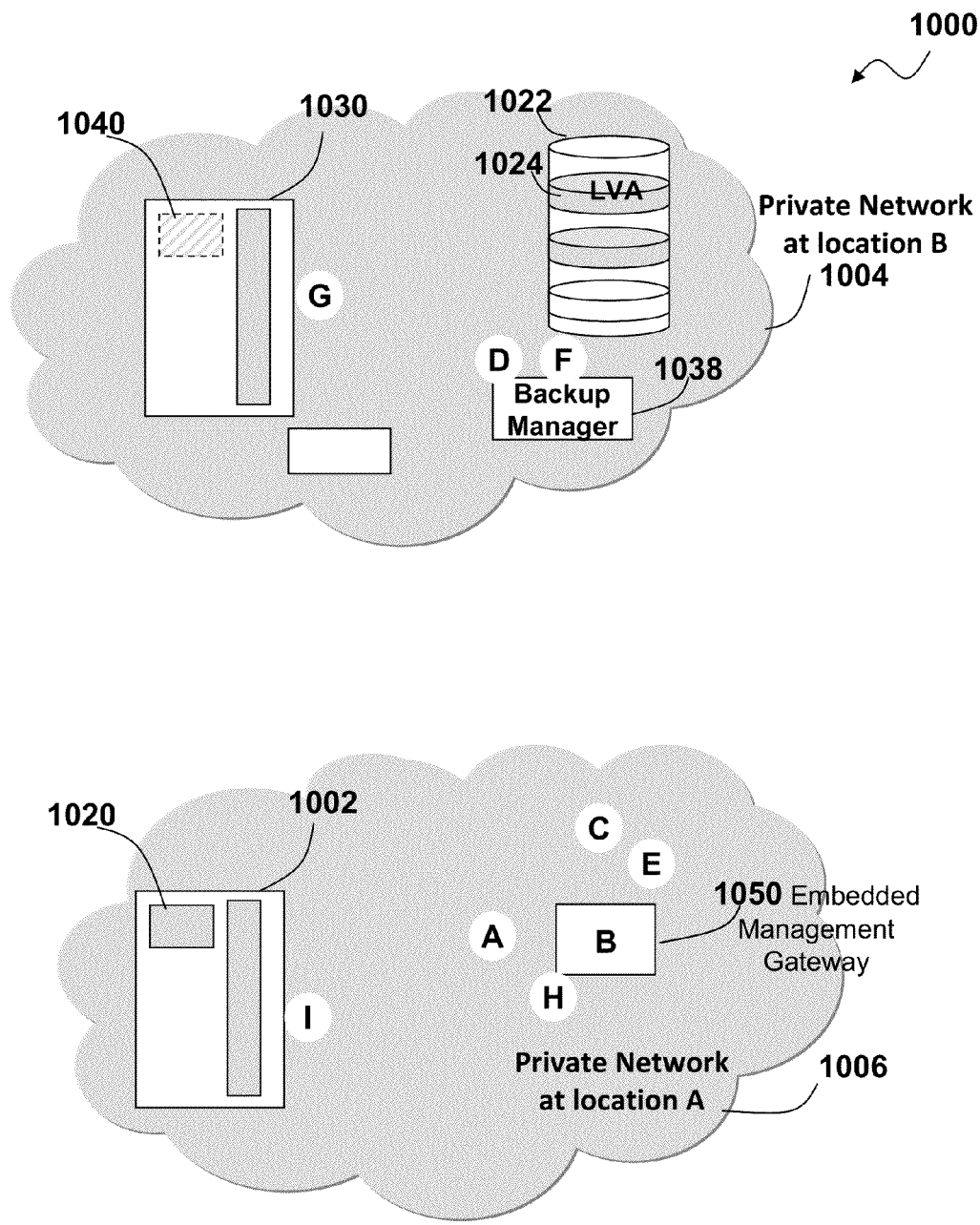
FIG. 10 illustrates the system and method for automated remote recovery of a guest computing system, in accordance with one embodiment.
Figure 11:
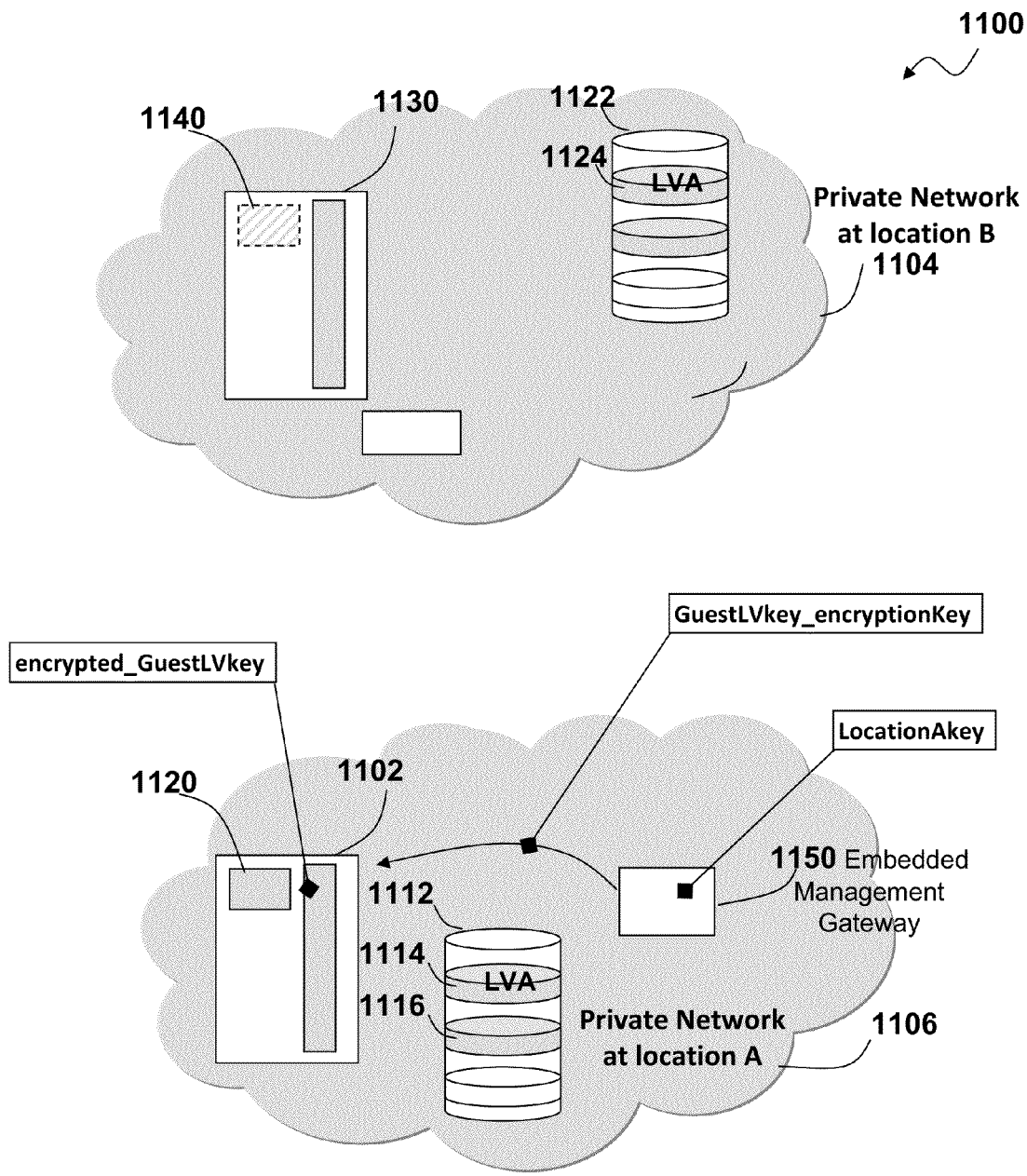
FIG. 11 illustrates a system of keys in an end-to-end encryption of guest computing system data, in accordance with one embodiment.

FIGS. 10 and 11 illustrate details of systems for system recovery, encryption, and license management within the context of embodiments of the present invention.

FIG. 10 illustrates a system 1000 for a guest computing system recovery process. Recovery of guests is a well known space with many products available on the market today. As an option the system 1000 illustrates recovery in the context of two sites which are linked to each other by a limited bandwidth connection, and can incorporate the described above with respect to FIGS. 1 through 9. The replication system, method and computer program embodied by the coupling of the systems described with respect to FIG. 6 and FIG. 7 provides high frequency replication of secondary storage data. Network connectivity is another problem found in some instances of recovery where remote recovery is limited to systems that have no internal or local network dependencies. This automatic guest recovery system and method allows for either network system 800 or 900, as well as many other simpler variations in the recovery process. A separable part of the recovery mechanism is a fail-safe system and method to insure that only one copy of the software runs at a time, even if network connectivity is broken between the two networks.

An Embedded Management Gateway component 1050 of system 1000 oversees many aspects of the recovery process, and must be available for this process to work. By way of example, and not by way of limitation, the Gateway Component 1050 can be a low power embedded Linux computer with a single network interface. The Gateway Component 1050 can co-reside on a private network 1006 (e.g., a LAN) at location A with a virtual computing platform 1002, which is also connected to the private network 1006.

The embodiment of the steps in the recovery system and method are associated with their respective active components in system 1000. Initially, Guest 1020 is running on virtual computing platform 1002. At regular intervals, the guest 1020 sends data representing a replication state of the guest 1020 to location B for to be stored in a storage medium 1022 such as a hard disk. For purposes of example, suppose that the last replication state of the system sent to location B occurred at time t=100. The recovery process begins when the guest 1020 fails.

As indicated by operation A, when the guest fails, a watchdog computer program on the Embedded Management Gateway 1050 detects that the guest is no longer network available. The watchdog program initiates a decision process to determine if/when the recovery process should begin. This decision process may use knowledge of the state of the virtual computing platform 1002 and predictions on how long it will take to restore service, if at all.

As a result of a decision to provide remote recovery, recovery is initiated as indicated at operation B. If virtual computing platform 1002 is available, the management gateway 1050 informs the virtual computing platform 1002 to no longer attempt to restart the guest 1020. If virtual computing platform 1002 is not available, this message will be resent once it becomes available. In order to insure that only one system is using the IP address of the server, and that only one running copy of the server is available at any time, there needs to be a third component managing this function. It is most effective to do both of these functions at the same point that networking terminations required for remote recovery occur, which is the management gateway 1050 in system 1000.

Next, as indicated by operation C, the watchdog program on the management gateway 1050 notifies a backup manager computer program 1038 to start computing system guest 1020 at location B 1004. In this example, the backup manager program 1038 can run on a computing system that is part of a private network 1004 at location B.

Further, as indicated by operation D, the backup manager 1038 selects a virtual computing system platform 1030 for running the recovered instance 1040 of the guest 1020. In preparation to launch the recovered instance 1040, the backup manager must identify the most recent version of the Logical Volume that represents the secondary storage for the guest instance, and retrieve a generic template of virtual machine startup parameters. The backup manager 1038 edits the virtual machine startup parameters to indicate the correct logical volume(s) to include and boot from, the scripts to be used to configure the guest's network configuration. For purposes of this example, the logical volume 1024 is used which represents the guest's state at time t=100. The backup manager must also identify and potentially create the named virtual Ethernet bridge that all the guest's network traffic will traverse, and will be connected exclusively to the network at location A 1006. If a dedicated VLAN or other resource requires exclusive use for this recovery process, these may also be allocated and subsequently managed. Scripts are prepared based on authenticated identity, and tunnels from gateway 1050 can be terminated according to the desired network configuration.

Additionally, as indicated by operation E, gateway 1050 now creates a secure tunnel to location B. Details of the creation and use of this tunnel can be as described above with respect to systems 800 or 900. Alternatively, some other network connectivity may be used to implement the secure tunnel to the gateway 1050.

Meanwhile, as indicated by operation F, the backup manager performs reverse replication on the logical volume to be used to run the recovered instance 1040 of guest 1020.

Moreover, as indicated by operation G, with the tunnel set up, the backup manager now starts the recovered instance 1040 of guest 1020 on platform 1030. Once running, recovery is complete.

Still yet, as indicated by operation H, preparations can be made to failback the guest to reside on platform 1002. The embedded gateway determines whether there is an existing snapshot available with the state of the secondary storage logical volume at time t=100. If so, a computer program, such as the third party program "dm-merge" is used to restore the logical volume back to the state indicated in the snapshot at time t=100. If this is not available, failback will occur only after some other means provides a baseline logical volume to be used to apply changes. A worst case would require a complete copy of the entire file system be transmitted to location A from location B.

Finally, as indicated by operation I, the recovered instance 1040 of guest 1020 can be shut down, and a final update to the logical volume can be extracted and sent to location A. The logical volume at location A is updated, and the guest computing system 1020 is restarted on platform 1002.

According to an alternative embodiment of the present invention, a system and method can encrypt data volumes at the block level so that virtual machines and applications are unaware, that allows incremental backup of the files to occur without the remote site having the encryption keys to decrypt or use the data, and a mechanism that can generate and store the data encryption keys at a primary site so that personnel at the primary site can control and audit access to the key, and set policy on when an automated recovery system is allowed to access the key for remote recovery.

In other words, the key can remain at the data-owner's site, and have conditions placed on accessing the only if automatic remote recovery is in progress, or only after some human intervention allows it. This is a means to insure privacy of data at rest in the cloud. Not that this applies to systems where the running virtual machine may be running in the cloud, and that system need not be replicated to the data owner's premise.

There are well known mechanisms for encrypting secondary storage, file systems and files that rely on private/public key pairs and symmetric keys. FIG. 11 illustrates an example of a system and method 1100 for setting up and accessing encryption keys used by these encryption methods in order to provide greater assurance of privacy of data in the event of a data or system loss.

The system and method 1100 uses a single key and control of the use of that key to insure that the key can only be disclosed by the policy of the owner of the key such that no persistent copy of the key is needed in a remote datacenter in order to perform data recovery operations. The system and method 1100 can be implemented with respect to an embodiment as in system 500, 800, or 900 that uses logical volumes where no extra encryption is required in the data replication process. Instead, encryption or decryption is in use only when the data is actually in use running a guest computing system. System 1100 performs encryption at the logical volume layer, allowing the guest computing systems to be unaware of the protections afforded their data. This approach to encrypting both guest secondary storage and backup snapshots can be performed outside of the context of other aspects of this invention. The novel aspect of the split key mechanism is its alignment with the semantics of recovery management and/or network addressing.

A logical volume 1114 provides the secondary storage for a guest 1120, which runs on a virtual computing system platform 1102 as part of a private network 1106 at location A. The virtual computing platform 1102 can be connected to a storage device 1112. By way of example, and not by way of limitation, a logical volume 1114 can be physically a part of the virtual computing system platform 1102, e.g., as part of the storage device 1112. The logical volume 1114 could alternatively be on a separate network attached storage system in another of many other possible embodiments.

The data stored in the logical volume 1114 may includes persistent executable software instructions configured to cause the system to implement one or more virtual machines that implement one or more applications, wherein each virtual machine is associated with one or more data volumes in the logical storage devices. Alternatively, the data stored in the logical volume 1114 may include persistent application data stored in one or more data volumes in the logical storage device or transient data stored in one or more data volumes in the logical storage devices.

The logical volume 1114 may be one of several logical volumes implemented on one or more storage devices. It is noted that in embodiments of the present invention, the storage devices do not all share a single encryption key. Nor does each storage device have to contain encrypted data. Furthermore, storage devices containing only transient data can be encrypted with random keys that are just-in-time generated and not persistently stored.

An embedded management gateway 1150 can also be connected to the virtual computing system platform 1102 by the private network 106 at location A. By way of example, and not by way of limitation, the management gateway 1150 can be implemented on a low power embedded Linux computer with a single network interface.

The logical Volume 1114 can encrypted by a symmetric encryption key called "GuestLVkey". When the embedded management gateway 1150 is installed, it can also be given a location-wide encryption key called "LocationAkey". The guest 1120 has a unique name, or identifier, usually a 128 bit globally unique identifier (GUID) or universally unique identifier (UUID). The GuestLVkey is encrypted, resulting in a string called "encrypted_GuestLVkey". The encryption key for encrypting GuestLVkey is generated from LocationAkey and a unique ID of the guest 1120. By way of example, and not by way of limitation the encryption key for encrypting GuestLVkey can be an SHA-128 hash of a concatenated string formed from LocationAkey and the UUID of the guest. In this example, the resulting key is called the "GuestLVkey_encryptionKey".

In order to start a guest computing system, the host of the logical volume manager must request the LocationAkey in order to decrypt and serve the logical volume contents. For example, the platform 1102 does not store the LocationAkey itself, but instead must request it from gateway 1150. When gateway 1150 receives the request, it must know the UUID of the guest computing system 1120. The gateway 1150 can then perform an SHA-128 hash of the concatenation of the LocationAkey and UUID resulting in the guest-specific key needed by the platform 1102 to decrypt the logical volume encryption key called GuestLVkey_encryptionKey. The GuestLVkey_encryptionKey is next encrypted using the public key of platform 1102. The result is sent to platform 1102 where it uses its own public key to decrypt and retrieve the logical volume encryption key called GuestLVkey_encryptionKey. Platform 1102 then uses the logical volume encryption key to decrypt the encrypted_GuestLVkey to get GuestLVkey. Platform 1102 then applies GuestLVkey to unlock the logical volume, and wipes memory of GuestLVkey_encryptionKey and GuestLVkey from the program memory used to coordinate all the aforementioned key manipulations.

If swap and temporary file space is located on a separate logical volume from guest data, a new logical volume 1116 for this temporary content can be generated at startup of the guest 1120 using a randomly generated encryption key. The contents of that temporary space will never be decryptable.

Presuming a replication embodiment like that illustrated in FIGS. 5, 6, and 7, logical volume encryption has no impact on performance during replication. The only impact occurs at restoration of service. For example, the contents of logical volume 1114 may be backed up to a second logical volume 1124 on a second storage device 1122 connected to a second private network 1104 at location B. If guest 1120 fails, a recovered instance 1140 of guest 1120 may be implemented on a virtual computing platform 1130 that is connected to the second private network 1104.

If the LocationAkey is not stored in location B, disclosure of the entire physical data stored in location B is non-interpretable by itself. Restoration of service requires that the LocationAkey be accessed from the gateway 1150 at startup time of any guest, including the recovered instance 1140 of guest 1120. This encryption limitation is exactly parallel to the limitations on network addressing and guest computing system instance availability, with additional protections that result from the unique property that encryption is linked to the identity of the guest 1120. In the case where the gateway 1150 at location A is network unreachable, a human operator can take responsibility to enable guests to run in at location B by manually entering the LocationAkey, or use a USB or other dongle to provide the LocationAkey to the platform 1102 electronically.

While various embodiments have been described above, it should be understood that they have been presented by way of example only, and not limitation. Thus, the breadth and scope of a preferred embodiment should not be limited by any of the above-described exemplary embodiments.

The invention claimed is:

1. A virtual computing system comprising:
   a virtual computing system platform comprising a processor, a storage device, and hypervisor, wherein the virtual computing system platform is configured to implement one or more guest computing systems at a first location, wherein each guest computing system is configured to perform information processing with one or more applications and incrementally forward updates to a persistently stored image of the guest computing system at a second location;
   a management gateway coupled to the one or more guest systems, wherein the management gateway is configured to run one or more of the guest computing systems at a second location if the one or more guest systems become unavailable at the first location, wherein the management gateway is configured to ensure that a single copy of each running guest computing system is present at the first location or the second location but not both; and
   one or more logical volume storage devices coupled to the processor and a memory, the storage devices retaining data on behalf of one or more virtual machines wherein:
      data stored in the one or more logical volume storage devices on behalf of a running virtual machine is encrypted by the storage device at block level using an encryption key;
      data retrieved from the one or more logical volume storage devices is decrypted from encrypted block level data on behalf of a running virtual machine using an encryption key;
      the contents of the storage devices are incrementally backed up without decryption so that the data can be replicated elsewhere;
      wherein the encryption key is persistently stored at a location associated with an owner of the data in the virtual machines;
      wherein the contents of the one or more logical volume storage devices are replicated at a location not associated with the data in the virtual machines
      wherein the encryption key is automatically or manually provided to the one or more logical volume storage devices according to policy when the encryption key is used to access the stored data in unencrypted form so that the encryption key does not need to be persistently stored at the location of the one or more logical volume storage devices.

2. The system of claim 1 wherein the data stored in the logical volumes includes
   persistent executable software instructions configured to cause the system to implement one or more virtual machines that implement one or more applications, wherein each virtual machine is associated with one or more data volumes in the logical storage devices.

3. The system of claim 1 wherein the data stored in the logical volumes includes persistent application data stored in one or more data volumes in the logical storage devices.

4. The system of claim 1, where the storage devices do not all share a single encryption key or do not contain encrypted data.

5. The system of claim 1 wherein the data stored in the logical volumes includes transient data stored in one or more data volumes in the logical storage devices.

6. The system of claim 5 where storage devices containing only transient data are encrypted with random keys that are just-in-time generated and not persistently stored.

7. The system of claim 1 wherein each guest system uses IP addresses associated with the first location, and the management gateway preserves the IP addresses when running the guest system at the second location by running the guest computing system as a network isolated entity tunneled inside a second network at the second location, whereby components on the first network do not see any change in the IP addresses needed on any client system of the guest computing system's applications.

8. The system of claim 1 wherein the guest system, the virtual computing platform hardware and software, and optionally software media and certificates of authenticity of software included in the guest, are physically delivered to the first location together or separately, wherein the guest system can also run at the second location.

* * * * *